United States Patent [19]
Minogue et al.

[11] 4,197,873
[45] Apr. 15, 1980

[54] FLUID OPERABLE VALVES

[75] Inventors: Michael I. Minogue, Langport; John R. Bennett, Yeovil; John C. Whitehead, Cheltenham, all of England

[73] Assignee: Coal Industry (Patents) Limited, London, England

[21] Appl. No.: 877,522

[22] Filed: Feb. 13, 1978

[30] Foreign Application Priority Data

Feb. 25, 1977 [GB] United Kingdom ............... 08022/77

[51] Int. Cl.² .......................................... F16K 31/122
[52] U.S. Cl. .................... 137/219; 137/240; 137/613; 137/614.18; 406/126
[58] Field of Search ........... 137/219, 240, 613, 614.18; 214/17 B; 302/41, 53, 55, 62; 406/126

[56] References Cited

U.S. PATENT DOCUMENTS

| 646,103 | 3/1900 | Faber | 137/240 |
|---|---|---|---|
| 646,104 | 3/1900 | Faber | 137/240 |
| 1,369,649 | 2/1921 | Gieseler | 302/62 |
| 1,724,017 | 8/1929 | Godfrey | 137/613 X |
| 2,305,724 | 12/1942 | Luetzelschwab | 137/240 |
| 3,133,554 | 5/1964 | Joebken | 137/240 |
| 3,429,331 | 2/1969 | Prevost | 137/219 |
| 3,570,510 | 3/1971 | Tsutsumi | 137/240 |

FOREIGN PATENT DOCUMENTS

| 651534 | 11/1962 | Canada | 302/53 |
|---|---|---|---|
| 2310358 | 9/1974 | Fed. Rep. of Germany | 302/53 |
| 1435645 | 5/1976 | United Kingdom | |

Primary Examiner—Gerald A. Michalsky
Attorney, Agent, or Firm—James C. Wray

[57] ABSTRACT

A fluid operable valve suitable for use in high temperature and pressure environments involving the flow of solids material, incorporates a main valve member and a pilot valve member co-operable with separate seats axially spaced apart in association with the inlet of the valve. The arrangement is such that in operation the pilot valve member is sequenced to close against its seat prior to the main valve member which is purged prior to closure by a gas to remove particles of material which might cause ineffective sealing.

9 Claims, 2 Drawing Figures

FLUID OPERABLE VALVES

This invention concerns improvements in or relating to fluid operable valves and in particular has reference to gas-operable valves suitable for use in pressure lock systems.

Such pressure lock systems are employed where it is required to effect the movement of particulate matter from one environment to another, the environments being at different pressures, the pressure lock system providing an intermediate pressure equalisation stage between the two environments. Certain processes which involve operation at an elevated pressure, i.e. superatmospheric pressure, produce particulate solid material which requires to be removed from the process equipment for disposal purposes or prior to the initiation of further process steps. For example, a number of processes concerned with the extraction of useful constituents, gases and liquids, from coal or carbonaceous substances operate at elevated temperature in the presence of a high pressure gas phase whereby the coal or carbonaceous material is fluidised or transported in the gas phase. As part of these processes it is desirable to separate any contaminating residual material from the carrier gas phase and remove it from the high pressure environment to another, e.g. one under atmospheric pressure. This allows the uncontaminated gas phase to be further processed, e.g. depressurised to yield gaseous and liquid products, and the solid residue to be disposed of or utilised in other processes.

In order to effect such a removal solids can be concentrated in a vessel by means of a separating device, e.g. a cyclone or filter, and subsequently a pressure equalisation stage for each environment is required. Such a stage is conventionally provided by a pressure lock system in which such pressure equalisation is effected sequentially for one environment and then the other, isolation from the one or the other being effected by a lock arrangement. A valve is usually employed as the lock arrangement, a valve member sealing on a seat provided at the inlet and/or outlet port of the pressure lock system which conveniently includes a hopper. Since particulate solid material is to pass through the valve, contamination of the sealing surfaces can occur resulting in poor sealing and a consequent loss of efficiency and indeed of correct functioning of the whole pressure lock system.

It is therefore an object of the present invention to provide an improved fluid-operable valve suitable for use in a pressure lock system.

Accordingly the invention provides a fluid-operable valve including a body, an inlet to a cavity within the body and an outlet communicating with the cavity, a first valve seat associated with the inlet, a second valve seat associated with the inlet and positioned downstream of the first valve seat, a pilot valve member co-operable with the first valve seat and actuable into or out of contact therewith, a main valve member co-operable with the second valve seat and fluid operable into or out of sealing contact therewith, and purge means directed towards a sealing face of the main valve member when, in use, the main valve member is in close adjacency to the second valve seat.

Conveniently the first and second valve seats are co-axial with respect to one another and to the inlet and may be formed on a replaceable valve seat insert releasably fixable within the inlet. The pilot valve and main valve members are preferably mounted co-axially for relative movement axially of the inlet, i.e. in line therewith.

The main valve member is fluid operable and may advantageously be gas operable; in this respect, the main valve member is provided on a stem carrying a piston reciprocable within a cylinder formed in a cylinder mounting block disposed within a part of the cavity of the valve body. The cylinder is preferably sealed from the cavity such as to prevent the ingress of extraneous matter which might cause damage to the moving parts. The cylinder mounting block is provided with ports for the introduction and exhaust of fluid to and from each side of the piston.

The pilot valve member may also be fluid operable and may in this case have a piston reciprocable within a further cylinder formed in the block, suitable ports also being provided for the further cylinder.

In a preferred embodiment, the pilot valve member is carried by a rod which is slidable co-axially within a bore formed axially of the stem carrying the main valve member. The rod extends through the stem and protrudes into the further cylinder whereat the piston is located on the rod, the further cylinder being separate from the cylinder for the main valve member piston.

The pilot valve and main valve members are conveniently of frusto-conical form.

In an alternative embodiment, the pilot valve member is resiliently biased by, for example, a spring, into a sealing position with the first seat.

The purge means may conveniently comprise a number of fluid passages provided in the body adjacent the inlet, and where an insert is associated with the inlet, further passages are located therein, a distribution collar for fluid being arranged circumjacent the insert and communicating with the passages in the body and in the insert.

By way of example only, two embodiments of fluid operable valve according to the invention are described below with reference to the accompanying drawings in which.

Figure 1:
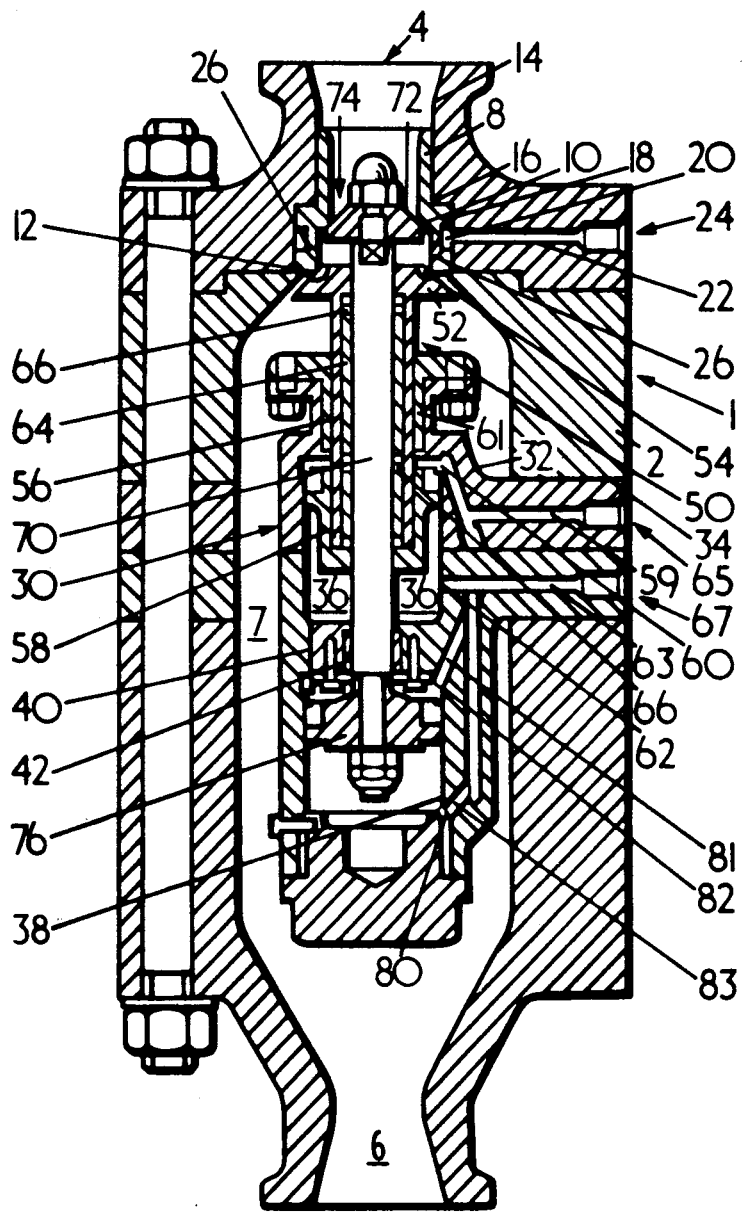
FIG. 1 is a longitudinal sectional view of a first embodiment.

Referring to FIG. 1 a fluid operable valve is depicted generally by the reference numeral 1 and includes a body 2 having an inlet 4 and an outlet 6 communicating with a cavity 7 defined therewithin. Associated with the inlet 4 is an insert 8 suitably affixed therein by means, for example, of welding, the insert 8 being provided with a first valve seat 10 and a second valve seat 12 located downstream and co-axially of the first valve seat 10. The inlet 4 is constituted by a stepped bore 14 having a shoulder 16 with which co-operates a collar portion 18 on the insert. The collar portion 18 is grooved at 20 and when in position within the bore 18, the groove 20 communicates with at least one fluid passage 22 provided in the body 2, a fluid inlet 24 leading to the passage 22. The collar portion 18 carries the second valve seat 12 and has nozzle formations 26 in fluid communication with the groove 20 and so orientated as in use to direct fluid for a purpose hereinafter described.

A cylinder mounting block 30 is located within at least a portion of the cavity 7 of the body 2 and is supported therein through the agency of an arm 32 extending laterally from the block and locating in a sealed manner within a bore 34 in the body 2. The block 30 defines a cylinder 36 superjacent (as viewed in the drawing) and co-axial with a cylinder 38, the cylinders being separated at 40 where a bushing and seal arrangement 42 is provided.

A main valve member 50 includes a frusto-conical head 52 having a stellite sealing face 54, and a hollow stem 56 which carries a piston 58 reciprocable within the cylinder 36 which has fluid ports 60, 62 connecting through passages 59, 63 to fluid inlets and outlets 65, 67 for supplying or exhausting pressure fluid. The hollow stem 56 is slidable in bush 61 in the block 30 and is provided internally thereof with bushes 64 and sealing rings 66 which are sealingly and slidably engaged by a rod 70 which has at one end thereof a frusto-conical head 72 forming part of a pilot valve member 74 and co-operable with the first valve seat 10. At the end of the rod 70 remote from head 72 is carried a piston 76 movable within the cylinder 38, the rod 70 extending through the bushing and seal arrangement 42. The cylinder 38 also has fluid ports 80, 82 connecting through passages 81, 83 to fluid inlets and outlets (not shown).

The operation of the valve 1 is as follows: In use, the inlet 4 is connected to process equipment, for example to the solids outlet of a cyclone separator (not shown) employed to precipitate solid particles from a gas at a superatmospheric pressure in the region of say 100–400 bar and at a temperature in the region of 400°–600° C. In the drawing the valve 1 is closed by pilot and main valve members 74, 50 respectively with the head 72 sealing against seat 10 and the head 52 sealing against seat 12. The valve members 74, 50 are maintained in the sealing positions by pressure fluid acting on the full bore side of the pistons 76, 58 in cylinders 38, 36 through the ports 80, 62 and passages 83, 63 respectively, fluid being fed from an external source through the inlet 67 for cylinder 36, and the inlet (not shown) for cylinder 38. The fluid is preferably an inert gas.

When material from the cyclone separator is required to be removed therefrom, the valve 1 is brought into operation. Initially a differential pressure is applied through ports 80, 82 to the piston 76 of the pilot valve member 74 such as to cause the piston to move downwardly as viewed in the drawing within the cylinder 38; in so doing the valve head 72 moves out of contact with the first seat 10 and material can pass on to the main valve head 52 which is then moved out of sealing engagement with the second seat 12 by the application of a differential pressure through ports 60, 62 to cause the piston 58 to move downwardly within cylinder 36 as viewed in the drawing. Once the pilot valve and main valve members are in open positions, material may pass into the cavity 7 of the valve body 2 and subsequently be discharged through the outlet 6, which may conveniently be connected to a lock hopper (not shown).

When it is desired to stop material flow through the valve 1, the pilot valve member 74 is moved by fluid pressure acting on the full bore side of piston 76 towards a position in which the valve head 72 contacts the first seat 10. In view of the fact that material has passed through the valve 1, the head 72 may be contaminated in some degree by particles of the material and may consequently be unable to seal effectively: the flow of material is however stopped by the contact as aforesaid. The main valve member 50 is then actuated by applying a differential pressure to the piston 58, or merely pressurising the full bore side of the piston and exhausting the other side to atmosphere, to cause it to move upwardly (as viewed in the drawing) to carry the head 52 to a position in close adjacency to the seat 12. The main valve member 50 is then caused to dwell momentarily in this position whereat a supply of pressure fluid, preferably a gas, is introduced through the nozzle formations 26 which form purge means for the seat 12. The pressure fluid so introduced is directed by the disposition of the formations 26 to impinge upon the sealing face 54 of the head 52 and in issuing forth in this way scours the face 54 to remove any contaminating material which may have adhered thereto during material flow through the valve 1. Once this scouring action has been effected the main valve member 50 continues its movement such that the sealing face 54 of the head 52 may sealingly contact the second valve seat 12. In this condition the valve effectively seals the cyclone separator (not shown) from the lock hopper.

Figure 2:
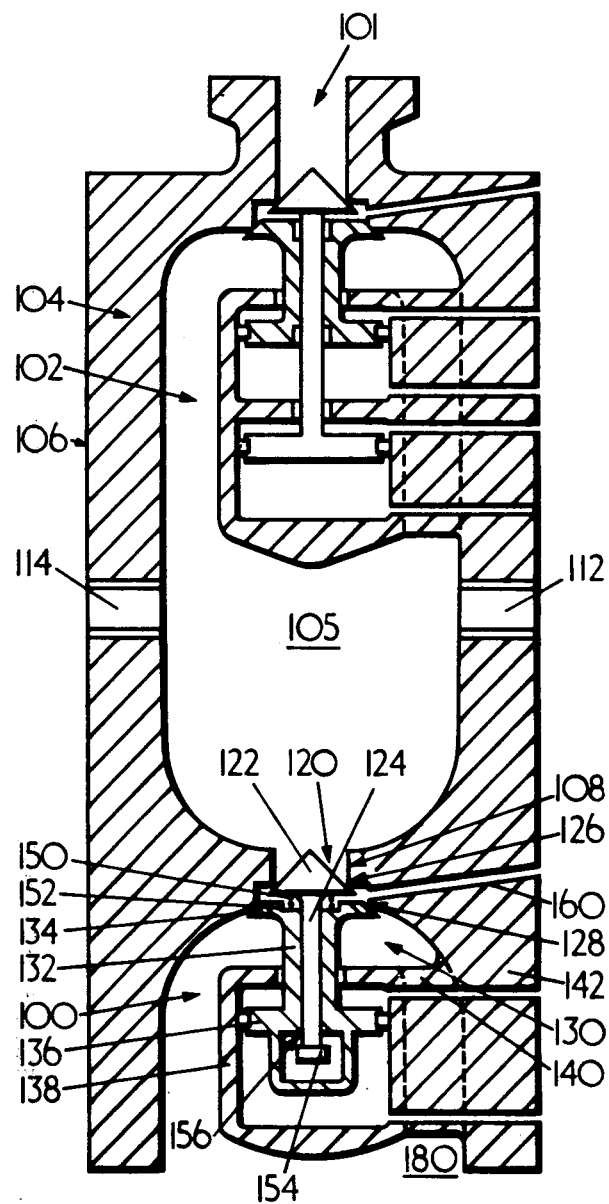
FIG. 2 is a schematic sectional view of a second embodiment of valve in combination with a first embodiment.

Referring now to FIG. 2, a second embodiment of the fluid pressure operable valve 100 is shown in combination with a first form of valve 102 in which the body 104 thereof constitutes a lock hopper 106. The valve 100 is associated with the outlet 108 of body 104 which has a pressure connection 112 and a de-pressurise connection 114.

The valve 102 is the same in all essential respects as that shown in FIG. 1 and thus no further description is given here.

The second form of valve 100 is similar to the first form in that a pilot valve member 120 is provided with a conical head 122 mounted on a stem 124, the head 122 being co-operable with a first seat 126 provided at the outlet 108 of hopper 106. A second seat 128 is located downstream and co-axially of seat 126 and is also provided at the outlet 108. A main valve member 130 including a stem 132 carries a frusto-conical head 134 for co-operation with the seat 128. The stem 132 is of hollow construction and the stem 124 of pilot valve member 120 is slidable co-axially therein; a piston 136 is carried by stem 132 remote from the head 134 and the piston is reciprocable within a cylinder 138 formed in a mounting block 140 attached to housing 142 extending from body 104 of hopper 106.

The pilot valve member 120 has a resilient bias in the form of an open-coiled compression spring 150 positioned between the head 122 and a recess 152 formed in the head 134 of main valve member 130, the stem 124 being provided with a stop 154 for abutting surface 156 of piston 136.

This second form of valve 100 is also provided with purge means diagrammatically shown at 160 such that when the head 134 of the main valve member 130 is in the vicinity of the seat 128, the sealing face of the head 134 may be purged by a fluid, e.g. a gas, issuing through the purge means 160. In use, the first form of valve 102 operates as hereinbefore described with reference to FIG. 1. When material has passed into the hopper 106 through inlet 101 and the valve 102 is shut, pressure equalisation may take place as between the cavity 105 of the hopper and the exterior or any other environment, say at 180, de-pressurization or pressurization as the case may be taking place through either connection 114, 112 respectively. Once the pressure equalisation has been effected, the valve 100 may be operated to open the outlet 108. For this purpose, a differential pressure is applied to piston 136 such as to cause it to move downwardly within cylinder 138, as viewed in the drawing. The head 134 of the main valve member 130 thus moves out of sealing engagement with the seat 128, whilst because of the spring bias the head 122 of pilot valve member 120 remains momentarily in contact with the seat 126 until the stop 154 on the stem 124 of the pilot valve member 120 is engaged by the abutment surface 156 of piston 136 as this moves towards completing its travel, or until the weight of material now in hopper 106 overcomes the bias, whereafter the material may pass from cavity 105 to the environment at 180.

When it is desired to shut the outlet 108, a differential pressure in the opposite sense is applied to piston 136 to cause it to rise in its cylinder 138. Since the spring 150 biases the two heads 134 and 122 apart, the head 122 comes into contact with its seat 126 first. This contact effectively cuts off material flow between cavity 105 and environment 180 and the purge means 160 are now actuated to introduce a flow of pressure fluid, e.g. air or an inert gas, which impinges upon the head 134 to clean the same of any particles which may have adhered thereto during flow of material through the outlet. The valve head 134 may be caused to dwell in a position in close adjacency to seat 128 whilst the purging operation is conducted. Once this operation is complete, the cylinder 138 may be pressurised further to bring the now cleaned head 134 into sealing engagement with the seat 128.

Whilst in FIG. 2 a different configuration of pilot and main valve members is arranged in association with the outlet than at the inlet, it is within the scope of the invention to provide the same configuration at the outlet as at the inlet to the valve body.

It will be observed that in both embodiments of FIGS. 1 and 2 the main and pilot valve members move in operation in the same direction when opening or closing. However, it will be understood that the present invention extends to a valve wherein the main and pilot valve members move during operation in opposite directions in relation to one another.

The control on the operation of the main and pilot valve members may conveniently be effected by a servo system incorporating solenoid operated control valves to ensure the correct opening and closure sequences.

The valve of the present invention thus provides a facility whereby sealing can be effected efficiently since the main valve member is not brought into sealing engagement with the second seat until the pilot valve member contacts the first valve seat and the main valve member has been cleaned by the purge fluid.

Since the valve is intended for use in working environments where high pressures and high temperatures prevail, the materials from which the working parts of the valve are made have to be selected accordingly. For example, temperatures of about 400°–500° C. and pressures of 100–400 bar are likely to be encountered in the processes for which this invention may find application. Materials for the sealing faces of the valve seats and the valve heads may be stellite and the remainder of the valve parts may be manufactured from nickel-chrome alloy.

We claim:

1. A fluid-operable valve including a body, a cavity within the body, an inlet means in the body and leading to the cavity, an outlet means in the body and communicating with the cavity, a first valve seat associated with the inlet means, a second valve seat associated with the inlet means and positioned downstream of the first valve seat, a pilot valve member co-operable with the first valve seat and adapted for actuation into or out of contact therewith, a main valve member co-operable with the second valve seat and fluid operable into or out of sealing contact therewith, the main valve member having a sealing face, and purge means directed towards the sealing face of the main valve member when, in use, the main valve member is in close adjacency to the second valve seat for a brief period after the pilot valve member contacts said first valve seat for purging of the sealing face of the main valve member, in which a cylinder mounting block is disposed within a part of the cavity of the valve body, a cylinder is formed in the cylinder mounting block, a stem is provided for the main valve member and a piston is carried on the stem and is reciprocable within the cylinder, the cylinder is sealed from the cavity and the cylinder mounting block is provided with ports for the introduction and exhaust of fluid to and from each side of the piston, the stem is provided with an axial bore, a further coaxial cylinder is formed within the cylinder mounting block in which a rod of the pilot valve member is slidable co-axially within the axial bore of the stem of the main valve member and within the further cylinder.

2. A fluid-operable valve according to claim 1 in which the pilot valve member is fluid operable.

3. A fluid-operable valve according to claim 2 in which the pilot valve member carries a piston reciprocable within the further cylinder, and ports are provided in the cylinder mounting block for the introduction and exhaust of fluid to and from each side of the piston.

4. A fluid-operable valve according to claim 3 in which the pilot valve member carries the piston by means of a rod.

5. A fluid-operable valve according to claim 1 in which the purge means comprise a number of fluid passage means provided in the body adjacent the inlet means.

6. A fluid-operable valve according to claim 1 and including a first valve seat associated with the outlet means, a second valve seat associated with the outlet means and positioned downstream of the first valve seat, a pilot valve member co-operable with the first valve seat and adapted for actuation into or out of contact therewith, a main valve member co-operable with the second valve seat and fluid operable into or out of sealing contact therewith, the main valve member having a sealing face, and purge means directed towards the sealing face of the main valve member when, in use, the main valve member is in close adjacency to the second valve seat.

7. A fluid-operable valve according to claim 6 in which the pilot valve member is resiliently biased into a sealing position with the valve seat.

8. A fluid-operable valve according to claim 6 in which the body is a lock hopper.

9. A fluid-operable valve according to claim 8 in which the body has a pressure connection and a depressurize connection opening into the cavity.

* * * * *